United States Patent
El-Moussa

(10) Patent No.: US 12,093,395 B2
(45) Date of Patent: Sep. 17, 2024

(54) APPLICATION DEPLOYMENT

(71) Applicant: British Telecommunications Public Limited Company, London (GB)

(72) Inventor: Fadi El-Moussa, London (GB)

(73) Assignee: British Telecommunications Public Limited Company (GB)

( * ) Notice: Subject to any disclaimer, the term of this patent is extended or adjusted under 35 U.S.C. 154(b) by 732 days.

(21) Appl. No.: 15/733,587

(22) PCT Filed: Mar. 4, 2019

(86) PCT No.: PCT/EP2019/055340
§ 371 (c)(1),
(2) Date: Sep. 4, 2020

(87) PCT Pub. No.: WO2019/170615
PCT Pub. Date: Sep. 12, 2019

(65) Prior Publication Data
US 2021/0004468 A1    Jan. 7, 2021

(30) Foreign Application Priority Data

Mar. 5, 2018 (EP) .................................. 18159887

(51) Int. Cl.
*G06F 21/57* (2013.01)
*G06F 8/60* (2018.01)
(52) U.S. Cl.
CPC .............. *G06F 21/577* (2013.01); *G06F 8/60* (2013.01); *G06F 2221/033* (2013.01)
(58) Field of Classification Search
CPC .... G06F 21/577; G06F 8/60; G06F 2221/033; G06F 2221/034
See application file for complete search history.

(56) References Cited

U.S. PATENT DOCUMENTS

| | | | | |
|---|---|---|---|---|
| 7,953,865 | B1 * | 5/2011 | Miller | ................. H04L 12/6418 370/254 |
| 8,806,591 | B2 * | 8/2014 | Dallas | .................... G06F 21/46 726/22 |

(Continued)

FOREIGN PATENT DOCUMENTS

EP    2816469 A1    12/2014

OTHER PUBLICATIONS

Eshete et al.; "Confeagle: Automated Analysis of Configuration Vulnerabilities in Web Applications", 2013, IEEE, pp. 188-197. (Year: 2013).*

(Continued)

*Primary Examiner* — Matthew Smithers
(74) *Attorney, Agent, or Firm* — Pranger Law PC

(57) ABSTRACT

A computer implemented method of improved security of an application for deployment to a virtualized computing environment, the method including receiving configuration information for the application; accessing a set of configuration descriptors for a known security attack, each descriptor encoding at least a portion of an application configuration so as to identify one or more descriptors matching at least part of the configuration information, each descriptor in the set having a probability that the security attack will occur in a deployed application having a configuration consistent with the descriptor; evaluating a risk score for a risk of occurrence of the security attack, the risk score evaluated from the probabilities associated with the identified descriptors; identifying a set of compatible alternative configurations for the application; evaluating a risk score for a risk of occurrence of the security attack for each alternative configuration; selecting an alternative configuration having a risk score meeting a predetermined threshold; and adjusting (Continued)

the application configuration information to implement the selected alternative configuration.

10 Claims, 4 Drawing Sheets

(56) References Cited

U.S. PATENT DOCUMENTS

| | | | | |
|---|---|---|---|---|
| 9,047,136 | B2* | 6/2015 | Thanga | G06F 9/5077 |
| 9,176,762 | B2* | 11/2015 | Deshpande | G06F 9/5011 |
| 9,483,644 | B1* | 11/2016 | Paithane | G06F 16/128 |
| 9,519,775 | B2* | 12/2016 | Sridhara | H04L 63/145 |
| 10,108,446 | B1* | 10/2018 | Steinberg | G06F 12/109 |
| 10,216,927 | B1* | 2/2019 | Steinberg | G06F 21/53 |
| 10,235,527 | B1* | 3/2019 | Dalessio | G06F 16/2379 |
| 10,482,245 | B2 | 11/2019 | El-Moussa et al. | |
| 10,484,402 | B2 | 11/2019 | El-Moussa et al. | |
| 10,558,809 | B1* | 2/2020 | Joyce | G06N 5/046 |
| 10,623,419 | B2 | 4/2020 | El-Moussa et al. | |
| 10,747,886 | B2 | 8/2020 | El-Moussa et al. | |
| 10,826,767 | B2* | 11/2020 | Barkovic | G06F 16/2474 |
| 2014/0033271 | A1* | 1/2014 | Barton | H04W 12/64 726/1 |
| 2014/0053226 | A1* | 2/2014 | Fadida | H04L 63/1408 726/1 |
| 2016/0014158 | A1* | 1/2016 | Schrecker | H04L 63/20 726/1 |
| 2016/0092185 | A1 | 3/2016 | Botti et al. | |
| 2016/0292401 | A1* | 10/2016 | Bell, Jr. | G06F 21/14 |
| 2016/0330236 | A1* | 11/2016 | Reddy | H04L 63/1416 |
| 2017/0034023 | A1* | 2/2017 | Nickolov | H04L 43/0817 |
| 2017/0242987 | A1* | 8/2017 | Williams | G06F 21/128 |
| 2017/0293887 | A1* | 10/2017 | Rathbun | G06Q 50/26 |
| 2017/0295197 | A1* | 10/2017 | Parimi | H04L 63/10 |
| 2017/0323113 | A1 | 11/2017 | El-Moussa et al. | |
| 2018/0025160 | A1 | 1/2018 | Hwang et al. | |
| 2018/0060575 | A1 | 3/2018 | El-Moussa et al. | |
| 2018/0060581 | A1 | 3/2018 | El-Moussa et al. | |
| 2018/0121657 | A1* | 5/2018 | Hay | G06F 21/51 |
| 2018/0205755 | A1* | 7/2018 | Kavi | G06F 21/577 |
| 2019/0188392 | A1* | 6/2019 | El-Moussa | G06F 21/577 |
| 2019/0258807 | A1* | 8/2019 | DiMaggio | G06F 21/577 |
| 2021/0286873 | A1 | 9/2021 | El-Moussa et al. | |

OTHER PUBLICATIONS

Ghani et al.; "User-Centric Security Assessment of Software Configurations: A Case Study", Feb. 2014, International Symposium on Engineering Secure Software and Systems. Springer, pp. 1-16. (Year: 2014).*

International Search Report and Written Opinion, International Application No. PCT/EP2019/055340, dated Apr. 8, 2019, 14 pages.

Ghani Hamza et al., "User-Centric Security Assessment of Software Configurations: a Case Study", Feb. 26, 2014, in: Jurjens J., Piessens F., Bielova N. (eds) International Symposium on Engineering Secure Software and Systems. ESSoS 2014. Lecture Notes in Computer Science, Springer, Cham (CH), XP047183620, vol. 8364, pp. 196-212, pp. 196-p. 210.

Search and Examination Report, GB Application No. GB1803475. 1, dated Aug. 31, 2018, 3 pages.

"International Preliminary Report on Patentability for Application No. PCT/EP2019/055340, mailed on Sep. 17, 2020", 11 pages.

"Office Action received for European Patent Application No. 18159887. 1, mailed on Aug. 2, 2018", 11 pages.

* cited by examiner

APPLICATION DEPLOYMENT

PRIORITY CLAIM

The present application is a National Phase entry of PCT Application No. PCT/EP2019/055340, filed Mar. 4, 2019, which claims priority from European Patent Application No. 18159887.1, filed Mar. 5, 2018, each of which is hereby fully incorporated herein by reference.

TECHNICAL FIELD

The present disclosure relates to the dynamic redeployment of cloud computing services.

BACKGROUND

Cloud computing deployments are virtualized computer systems instantiated with selected and configured components including software components and hardware components that are virtualized equivalents of hardware components, all of which is accessible via a network such as the internet.

An application deployed to virtualized computing environments, just like physical or hybrid environments, are susceptible to attack by malicious or rogue entities capable of accessing, communicating with or otherwise interoperating with the application.

SUMMARY

It is desirable to mitigate such attacks in virtualized computing environments.

The present disclosure accordingly provides, in a first aspect, a computer implemented method of improved security of an application for deployment to a virtualized computing environment, the method comprising: receiving configuration information for the application; accessing a set of configuration descriptors for a known security attack, each descriptor encoding at least a portion of an application configuration so as to identify one or more descriptors matching at least part of the configuration information, each descriptor in the set having a probability that the security attack will occur in a deployed application having a configuration consistent with the descriptor; evaluating a risk score for a risk of occurrence of the security attack, the risk score evaluated from the probabilities associated with the identified descriptors; identifying a set of compatible alternative configurations for the application; evaluating a risk score for a risk of occurrence of the security attack for each alternative configuration; selecting an alternative configuration having a risk score meeting a predetermined threshold; and adjusting the application configuration information to implement the selected alternative configuration.

In some embodiments, the risk score for each alternative configuration is evaluated from probabilities associated with descriptors in the set of configuration descriptors identified as matching at least part of the alternative configuration.

In some embodiments, the risk scores are evaluated by combining a plurality of probabilities associated with identified matching descriptors.

In some embodiments, the risk scores are evaluated based on a product of a plurality of probabilities associated with identified matching descriptors.

In some embodiments, the method further comprises deploying the application to the virtualized computing environment in accordance with the adjusted configuration information.

In some embodiments, the configuration information includes one or more of: a specification of an operating system for the application; a specification of virtualized computer network facilities for the application; a specification of virtualized storage for the application; a specification of middleware software for the application; and a specification of application software for the application.

In some embodiments, the set of configuration descriptors for the known security attack are defined based on configuration information for applications in which the security attack has occurred.

In some embodiments, each configuration descriptor in the set of configuration descriptors for the known security attack is a set of identifiers of application configuration parameters derived from the configuration information for the applications in which the security attack has occurred as a set of all common configuration parameters for all such applications.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION OF THE DRAWINGS

The configuration of an application for deployment in a virtualized computing environment is specified in application configuration information such as a deployment specification or deployment descriptor. The configuration information can include an identification of virtualized computing resources and components for instantiation to effect the deployment of the application. The configuration information can include, inter alia: an identification and/or specification of the virtualized computing environment in which the application is to be deployed, such as an identification of a cloud computing service provider, virtualization technology, hypervisor or the like and/or a specification of how such resources are to be configured including, for example, a virtual machine configuration such as a specification of processing, memory, storage and virtualized device availability; an identification and configuration of an operating system, operating environment and/or middleware software; a specification of virtualized or physical storage devices such as virtual disks, virtual memory and the like; a specification and configuration of communications facilities required such as an identification of virtualized network adapters, network communications links, protocols, security solutions and the like; a specification and configuration of application software required such as web server, database software, business software or the like; and other resources deployable and/or installable within a virtualized computing environment.

In embodiments of the present disclosure the configuration information for an application is encoded for use in evaluating a measure of risk for the application if deployed in view of known attacks that will threaten the deployed application. The measure of risk is evaluated on the basis of known attacks and the susceptibility of known application configurations defined in a set of configuration descriptors, each descriptor corresponding to a subset of application configuration parameters and being associated with a particular attack with a predetermined degree of probability that the attack will occur in a deployed application having a configuration consistent with the descriptor.

Furthermore, embodiments of the present disclosure identify compatible alternative application configuration(s) and evaluate a measure of risk of the threat for those configurations also. On this basis, embodiments of the present disclosure can adjust the application configuration information to implement a selected alternative configuration so as to reduce a risk of a particular attack by deploying an application with a configuration known to exhibit a reduced probability of the attack occurring.

Figure 1:
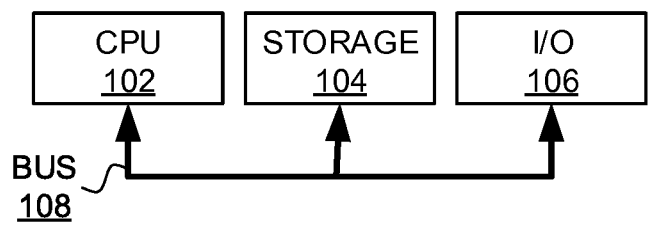
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
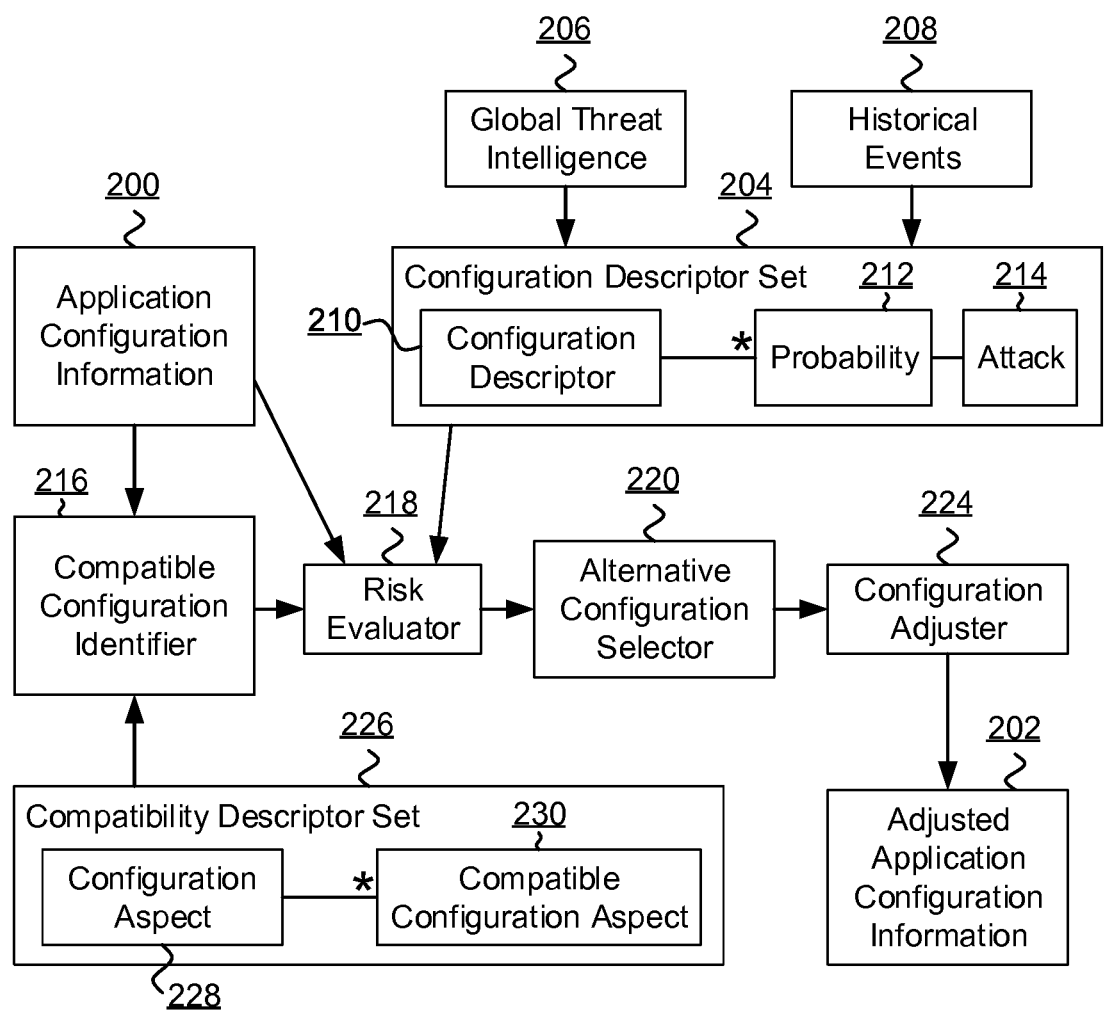
FIG. 2 is a component diagram of an arrangement for improving security of an application for deployment to a virtualized computing environment in accordance with embodiments of the disclosure.

FIG. 2 is a component diagram of an arrangement for improving security of an application for deployment to a virtualized computing environment in accordance with embodiments of the present disclosure. Application configuration information 200 is provided as an identification, specification and/or configuration of resources required for deploying an application in the virtualized computing environment, such as those resources described above. The application configuration information 200 is preferably encoded in accordance with the encoding method for a configuration descriptor described below and with reference to FIGS. 4 and 5.

The configuration information 200 is received by a risk evaluator 218 as a hardware, software, firmware or combination component for evaluating a risk score for a risk of occurrence of a security attack 214 in, with or for an application deployed in accordance with the application configuration information 200. The risk evaluator 218 accesses or receives a set of configuration descriptors 204 for evaluating the risk score.

The set of configuration descriptors 204 includes one or more configuration descriptors 210 each encoding at least a portion of an application configuration so as to identify one or more aspects of a configuration of an application. For example, a configuration descriptor 210 may encode an identification of a particular operating system, an operating system configuration and a specification of a network adapter arrangement for an application. In another example, a configuration descriptor 210 may encode an operating system and a web server including a web server configuration for an application. Notably, each configuration descriptor 210 encodes at least part of an application configuration, can encode an entire application configuration, and can encode as little as a single aspect, feature, resource or configuration of an application. Further notably, a configuration descriptor 210 is not necessarily sufficient to describe an entire application, though it may be so sufficient. The configuration descriptor 210 is intended to identify features of an application configuration that are determined to be indicative of a probability 212 of an attack 214.

The configuration descriptor set 204 in FIG. 2 is illustrated as a data definition showing relationships between a configuration descriptor 210, a probability 212 and a security attack 214. Specifically, a configuration descriptor 210 is associated with zero or more (indicated by the asterisk) probabilities 212, each probability being related to a single attack 214. The probability 212 for an attack 214 indicates likelihood of occurrence of the attack 214 for an application including a configuration consistent with the configuration descriptor 210. Each configuration descriptor 210 in the set 204 can be associated with multiple attacks 214 via multiple probabilities 212.

The encoding of a configuration descriptor 210 can take any suitable form and one approach is described with reference to FIGS. 4 and 5. Notably, while the FIGS. 4 and 5 are described in respect of a configuration descriptor 210, a similar or identical approach can be adopted for specifying the configuration information for an application.

Figure 4:
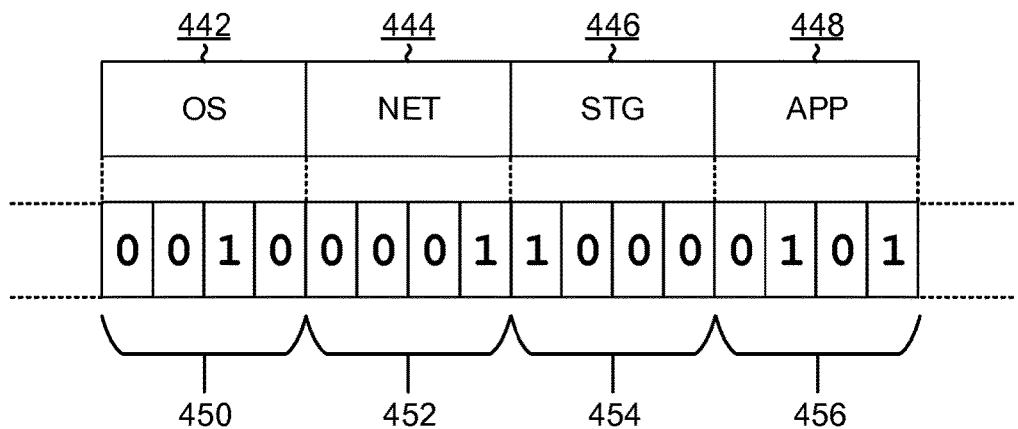
FIG. 4 illustrates a mechanism for encoding a configuration descriptor in accordance with embodiments of the present disclosure.
Figure 5:
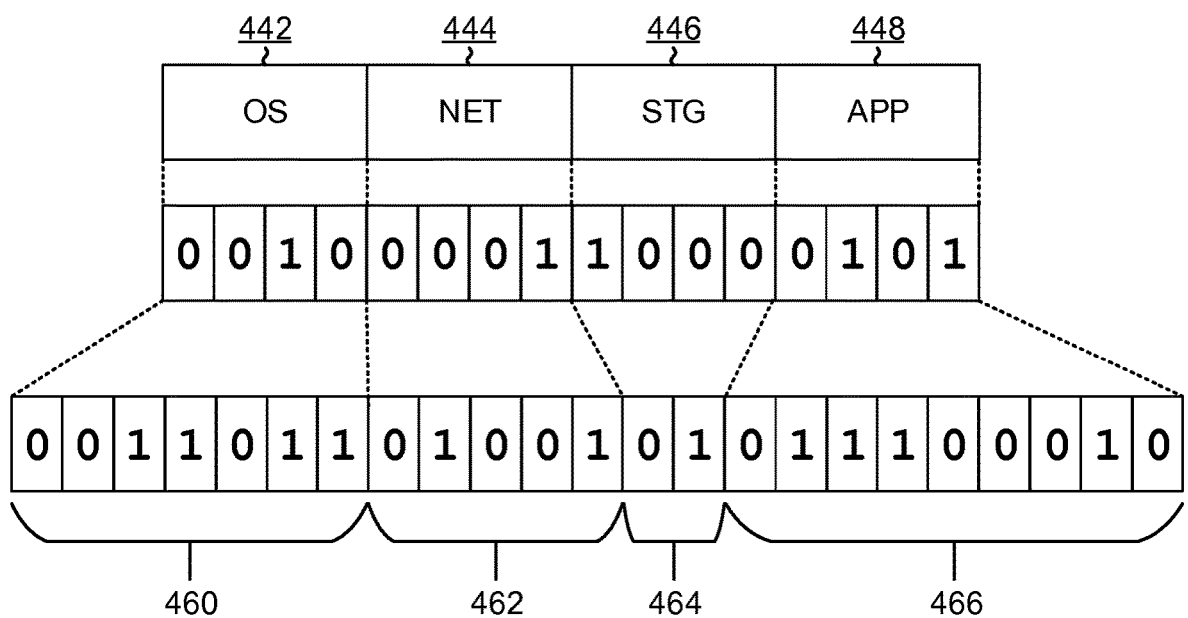
FIG. 5 illustrates a mechanism for encoding resource configuration information in a configuration descriptor in accordance with embodiments of the present disclosure.

FIG. 4 illustrates a mechanism for encoding a configuration descriptor 210 in accordance with embodiments of the present disclosure. The configuration descriptor 210 is illustrated for encoding four main categories of resource for an application including: an operating system 442; networking resources 444; storage resources 446; and software applications 448. It will be appreciated by those skilled in the art that many other types of resource may be involved in the deployment of an application to a virtualized computing environment (including those resources described previously) and an encoding can be extended, adapted or reconfigured to accommodate all or any required subset of such resources.

According to the scheme for encoding a configuration descriptor 210 in FIG. 4, a series of binary bits are provided for identifying resources in each category. For simplicity, the example of FIG. 4 provides four bits per category though any suitable number of bits—including different numbers of bits for each category—could be employed. For example, the operating system category 442 includes four bits 450 including: a first bit for indicating a 32-bit Microsoft Windows 10 deployment; a second bit for indicating a 64-bit Microsoft Windows 10 deployment; a third bit for indicating a 64-bit Red Hat Linux deployment; and a fourth bit for indicating a 64-bit AIX deployment. Similarly, the networking category 444 includes four bits 452 including: a first bit for indicating a virtualized 10Base-T network interface card (NIC); a second bit for indicating a virtualized 100Base-T NIC; a third bit for indicating a virtualized network router; and a fourth bit for indicating a virtualized network access point. The storage category 446 includes four bits 454 including: a first bit for indicating a virtualized hard disk drive; a second bit for indicating a virtualized solid state storage device; a third bit for indicating virtualized stream storage device; and a fourth bit for indicating virtualized network storage. The application category 448 includes four bits 456 including: a first bit for indicating a database server application; a second bit for indicating a web server application; a third bit for indicating a messaging middleware application; and a fourth bit for indicating a transaction processing middleware application.

Thus, the bit values indicated in each category serve to describe at least a portion of a configuration of an application such that, for example, a binary '1' indicates the presence of an indicated resource and a binary '0' indicates either the absence of an indicated resource or the irrelevance of an indicated resource (where all bits in a category have a value of '0' then the category is indicated as being irrelevant to the configuration descriptor 210).

In addition to encoding an identification of virtualized resources, a configuration descriptor 210 further includes an indication of a configuration, arrangement, version, type, variant or other specification of the identified resources. FIG. 5 illustrates a mechanism for encoding resource configuration information in a configuration descriptor 210 in accordance with embodiments of the present disclosure. As can be seen in FIG. 5, each of the categories of resource are associated with further binary bits for encoding resource configuration information. For example, the operating system category 442 encoded in bits 450 are further associated with bits 460 for indicating configuration information for an identified operating system. The meaning, arrangement and encoding of each set of configuration information 460 to 466 can differ depending on resources indicated in each category. Thus, by way of example, the bits 460 indicating a configuration of an operating system 442 can serve to identify, inter alia: a version, release or other identifier of a particular distribution of the operating system; a manufacturer or distributor of the operating system; a file system of the operating system; one or more features included or excluded from the operating system on deployment; and other operating system configuration information as will be apparent to those skilled in the art. In a preferred embodiment, the configuration information encoded in bits 460 to 466 indicated in FIG. 5 are appended to the series of bits 450 to 456 specifying resources in categories of resource in FIG. 4 to constitute a configuration vector as a complete configuration descriptor 210.

Returning to FIG. 2, the configuration descriptor set 204 is obtained, generated, inferred or determined based on two primary sources: global threat intelligence information 206; and historical security events 208. Either or both source can provide security event information relating to deployed applications whether locally or globally. Attacks 214 in deployed applications can be detected, identified and/or confirmed in such deployed applications by known security solutions including intrusion detection, malware detection, virus scanning, application failure, manual detection or other suitable attack determination means as will be apparent to those skilled in the art. Notably, both or either of the global threat intelligence 206 and historical event 208 sources of information can generate potentially multiple security attack events for a particular attack and relating to a deployed application having a particular configuration. An exemplary mechanism for consolidating such potentially multiple events to generate a single configuration descriptor 210 for an attack 214 will now be described with reference to FIG. 6.

Figure 6:
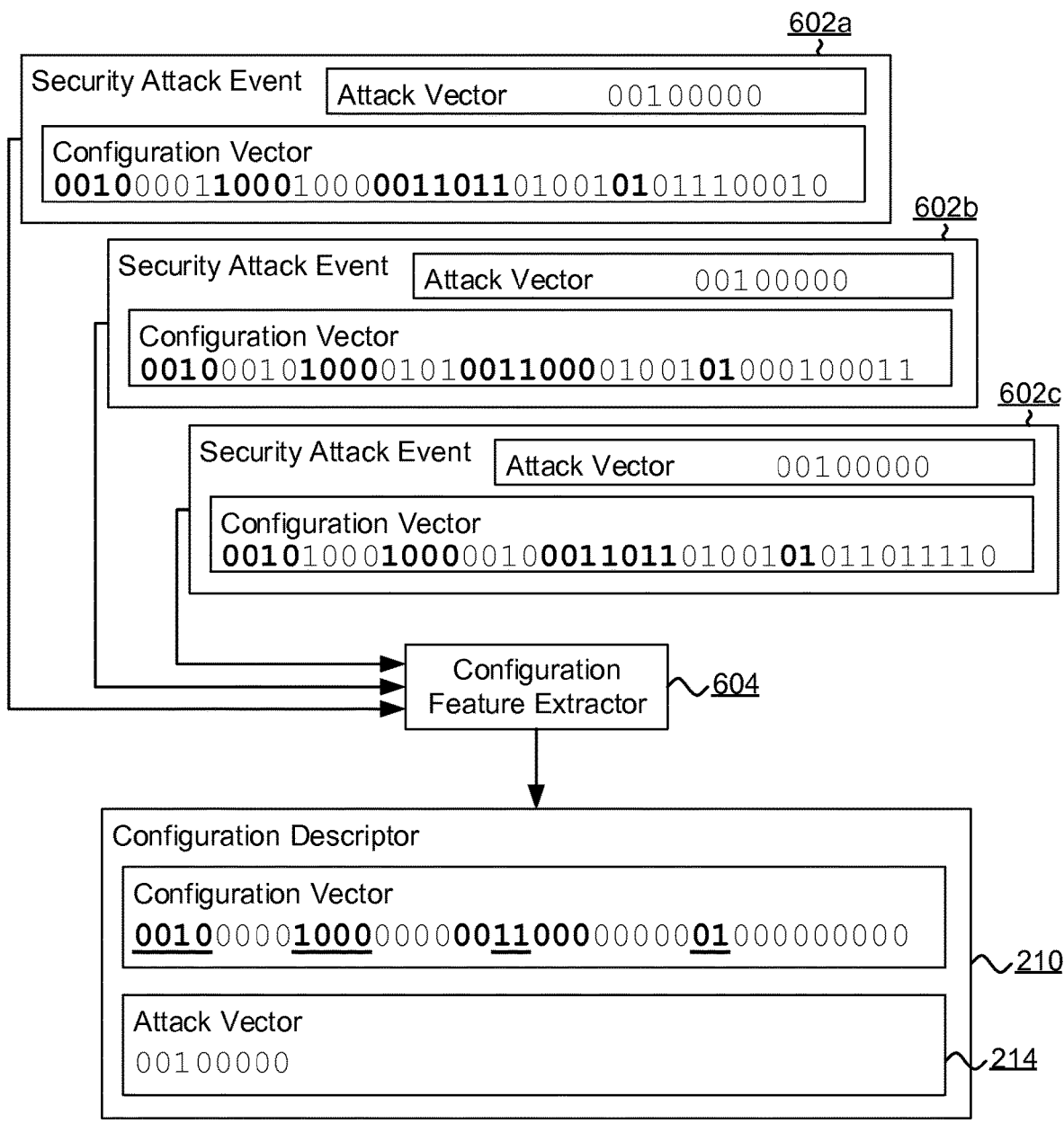
FIG. 6 illustrates the operation of a configuration feature extractor for generating a configuration descriptor from a plurality of security attack events in accordance with embodiments of the present disclosure.

FIG. 6 illustrates the operation of a configuration feature extractor 604 for generating a configuration descriptor 210 from a plurality of security attack events 602 in accordance with embodiments of the present disclosure. Each security attack event 602a, 602b and 602c is generated by a deployed application having been subjected to an attack. The attack causing each of the security events 602 can be the same attack in the sense that, for example, the same malicious code was executed, or can be the same in the sense that the attacks exploit the same vulnerability in each of multiple deployed applications. Identifying attacks that correspond to each other sufficiently to be categorized generally as "the same attack" can itself be challenging since different deployed applications may have different configurations and an attacking entity such as a person, agent, software or the like may employ subtly different mechanisms to exploit one or more vulnerabilities exhibiting subtly differently. To address this challenge, some embodiments of the present disclosure employ an attack vector mechanism for characterizing an attack. For example, an attack vector can be an encoding of an attack occurrence based on a categorization and/or characteristics of the attack.

In one embodiment, an attack vector is a series of binary digits each indicating a type, category or nature of an attack. For example, there may be binary digits to indicate each of: a worm; a virus; a Trojan; spyware; rootkit; ransomware; a bot; and adware. In other embodiments a more sophisticated categorization and/or characterization of an attack may be employed including: the timing, regularity and/or frequency of the attack; the effect of the attack on CPU usage; the effect of the attack on network connectivity; the effect of the attack on freezing or crashing of a PC; indications of data leak or data loss arising from the attack; indications of modification of data, files or application software; user interface, display, presentation or output changes arising from the attack; the number, nature, type and particular identifiers of programs, processes, tasks or other code executing during or following the attack; messages or communications being sent, received or monitored during or after the attack; and other characteristics of an attack as will be apparent to those skilled in the art.

Accordingly, each security attack event 602 in FIG. 6 includes an attack vector indicating the same attack so allowing the events 602 to be considered together as a group. The configuration feature extractor 604 is a hardware, software, firmware or combination component for extracting common configuration features from configuration vectors associated with each event 602. Each configuration vector in FIG. 6 is encoded according to the exemplary encoded described above with respect to FIGS. 4 and 5, with each category of resource and configuration information being distinguished by alternating bold (emphasized) and non-bold binary bits. From a comparison of the configuration vectors of the security attack events 602a, 602b and 602c it can be seen that there is commonality in the first group of four binary digits "0010" (corresponding to bits 450 identifying an operating system per FIG. 4), the third group of four binary digits "1000" (corresponding to bits 454 identifying virtualized storage resource per FIG. 4), two bits of the first set of configuration bits (corresponding to the configuration bits 460 for the operating system per FIG. 5), and two bits of the third set of configuration bits (corresponding to the configuration bits 464 for storage per FIG. 5). Thus, the configuration feature extractor 604 takes the multiple events 602 and consolidates them into a single configuration descriptor 210 by extracting the common features in the configuration vectors and associating the extracted common features with the attack vector of the attack 214.

Additional to this, a probability of occurrence of the attack 214 for an application exhibiting a configuration consistent with the configuration vector of the configuration descriptor 210 is determined. This probability can be determined based on statistics for (e.g. a count of) multiple occurrences of the attack 214 and statistics for (e.g. a count of) a number of occurrences of the attack 214 in applications having a configuration consistent with the configuration descriptor. The ratio of these statistics identifies a proportion of all occurrences of the attack experienced by applications having a configuration consistent with the configuration descriptor 210 and this proportion is a suitable basis for the probability 212. Other mechanisms for determining the probability 212 on the basis of attack statistics will be apparent to those skilled in the art.

Returning to FIG. 2, the risk evaluator 218 identifies the set of configuration descriptors 204 based on a comparison of the application configuration information 200 and configuration descriptors 210 in, for example, a global set (or universe) of configuration descriptors 210. In some embodiments, the configuration information 200 is encoded in a manner consistent with the configuration descriptors 210 as described with reference to FIGS. 4 and 5 and a comparison of the configuration information 200 with configuration descriptors 210 becomes a straightforward bitwise compare to identify relevant configuration descriptors 210. For example, logical operations such as the AND operation can be used to compare the configuration information 200 with configuration descriptors 210 to identify the set 204. In some embodiments, configuration descriptors 210 are identified as relevant if they indicate virtualized resources and/or configuration that is entirely consistent with that of the application configuration information 200—i.e. all the active bits (value "1") in a configuration descriptor 210 are also active (value "1") in the application configuration information 200.

In one embodiment, the identification of the set 204 is undertaken irrespective of any particular attack 214 such that all relevant configuration descriptors 210 are identified for the configuration information 200. In such an embodiment, the attacks 214 associated with each identified relevant configuration descriptor 210 are considered in turn. In an alternative embodiment, a particular attack is known up-front and configuration descriptors 210 associated with the predetermined attack are identified to constitute the set 204.

The risk evaluator 218 also identifies a set of compatible alternative configurations for the application by way of, for example, a compatible configuration identifier 216. The compatible configuration identifier 216 is a hardware, software, firmware or combination component for accessing a further set 226 of compatibility descriptors to identify alternatives to the application configuration information 200 that are equivalent to, substitutable for or otherwise compatible with the configuration information 200. For example, two versions of the same operating system may be considered substitutable and, therefore, compatible such that one version could be replaced with the other version. The compatibility descriptor set 226 employed by the compatible configuration identifier 216 is illustrated in FIG. 2 by way of a data definition in which a configuration aspect 228 is associated with zero or more compatible configuration aspects 230. A configuration aspect 228 is a part of a configuration descriptor as, for example, described with respect to FIGS. 4 and 5, such as a category 450 to 456 or a configuration 460 to 466. Thus, a configuration aspect 228 can, for example, constitute a single virtualized network resource encodable in a configuration descriptor such as "1000" which may relate to 10Base-T NIC, for example. Each configuration aspect 228 is associated with zero or more compatible configuration aspects, so the 10Base-T NIC may be associated with a 100Base-T NIC, for example (e.g. encoded as "0100" as a compatible configuration aspect).

Figure 3:
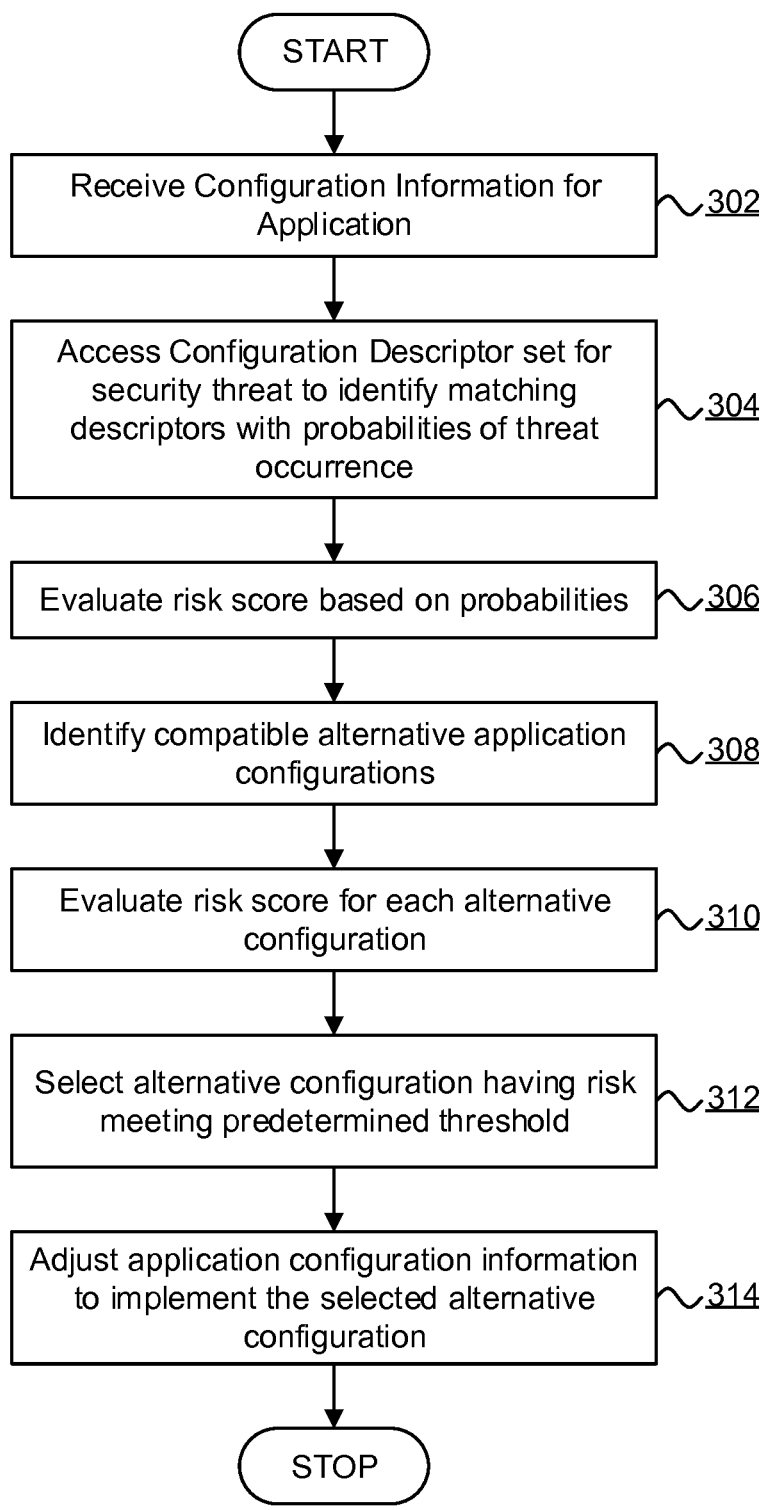
FIG. 3 is a flowchart of a method for improving security of an application for deployment to a virtualized computing environment in accordance with embodiments of the present disclosure.

The operation of the risk evaluator 218 will now be described with reference to the method illustrated in FIG. 3. FIG. 3 is a flowchart of a method for improving security of an application for deployment to a virtualized computing environment in accordance with embodiments of the present disclosure. Initially, at 302, the risk evaluator 218 receives or accesses the configuration information 200, in some embodiments encoded according to the illustrative encoding example described with respect to FIGS. 4 and 5. At 304 the risk evaluator 218 accesses or receives the set 204 of configuration descriptors 210 for a known security attack 214. The risk evaluator identifies one or more descriptors 210 in the set 204 matching at least part of the configuration information 200. At 306 the risk evaluator 218 evaluates a risk score for a risk of occurrence of the security attack 214 were the application to be deployed according to the configuration information 200.

The risk score is evaluated from the probabilities associated with the identified descriptors. For example, the risk score is evaluated by combining the probabilities associated with all configuration descriptors 210 identified in the set 204, such as a product of all descriptors in the set 204.

At 308 the risk evaluator 218 identifies a set of compatible alternative configurations for the application, such as by way of the compatible configuration identifier 216 described above. At 310, the risk evaluator 218 evaluates a risk score for each compatible alternative configuration. The risk score for a compatible alternative configuration is evaluated in the same way as for the configuration information 200, i.e. by first identifying a configuration descriptor set 204 including configuration descriptors 210 matching each alternative configuration, and then evaluating a risk score for each alternative configuration based on probabilities 212 associated with identified configuration descriptors 210 in the set 204 for the alternative configuration.

At 312 an alternative configuration selector 220 such as a hardware, software, firmware or combination component (in some embodiments a component of the risk evaluator 218) selects an alternative configuration having a risk score meeting a predetermined threshold. In some embodiments, the predetermined threshold can be a predetermined risk score. Alternatively, the predetermined threshold is some proportion of the risk score evaluated for the application configuration 200, such as 50%, 60%, 70% of the risk score of the application configuration 200. In other embodiments, the predetermined threshold can be defined as a condition, criterion or criteria such as a lowest risk score evaluated for a compatible alternative configuration, such alternative configuration therefore being selected.

At 314 a configuration adjuster 224 such as a hardware, software, firmware or combination component (in some embodiments a component of the risk evaluator 218) adjusts the application configuration information 200 to implement the selected alternative configuration. For example, one or more configuration aspects of the configuration information 200 can be substituted by configuration aspects of the selected compatible alternative configuration. In this way, an adjusted application configuration information 202 is generated having a lower risk of attack by security attack 214 than the original application configuration information 200. In some embodiments, the application is deployed to a virtualized computing environment in accordance with the adjusted configuration information.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of improved security of an application for deployment to a virtualized computing environment, the method comprising:
  receiving configuration information for the application;
  accessing a set of configuration descriptors for a known security attack, each configuration descriptor in the set encoding at least a portion of an application configuration so as to identify one or more configuration descriptors matching at least part of the configuration information, each configuration descriptor in the set having a probability that the known security attack will occur in a deployed application having a configuration consistent with the configuration descriptor;
  evaluating a risk score for a risk of occurrence of the known security attack, the risk score evaluated from the probabilities associated with the identified configuration descriptors;
  identifying a set of compatible alternative configurations for the application;
  evaluating a risk score for a risk of occurrence of the known security attack for each compatible alternative configuration in the set;
  selecting a compatible alternative configuration having a risk score meeting a predetermined threshold; and
  adjusting the application configuration information to implement the selected compatible alternative configuration.

2. The method of claim 1, wherein the risk score for each compatible alternative configuration is evaluated from probabilities associated with configuration descriptors in the set of configuration descriptors identified as matching at least part of the compatible alternative configuration.

3. The method of claim 1, wherein the risk scores are evaluated by combining a plurality of probabilities associated with identified matching configuration descriptors.

4. The method of claim 3, wherein the risk scores are evaluated based on a product of a plurality of probabilities associated with identified matching configuration descriptors.

5. The method of claim 1, further comprising:
  deploying the application to the virtualized computing environment in accordance with the adjusted configuration information.

6. The method of claim 1, wherein the configuration information includes one or more of:
  a specification of an operating system for the application;
  a specification of virtualized computer network facilities for the application;
  a specification of virtualized storage for the application;
  a specification of middleware software for the application; and
  a specification of application software for the application.

7. The method of claim 1, wherein the set of configuration descriptors for the known security attack are defined based on configuration information for applications in which the known security attack has occurred.

8. The method of claim 7, wherein each configuration descriptor in the set of configuration descriptors for the known security attack is a set of identifiers of application configuration parameters derived from the configuration information for the applications in which the known security attack has occurred as a set of all common configuration parameters for all such applications.

9. A computer system comprising:
  a processor and memory storing computer program code for performing the method of claim 1.

10. A non-transitory computer-readable storage medium storing a computer program element comprising computer program code to, when loaded into a computer system and executed thereon, cause the computer system to perform the method as claimed in claim 1.

* * * * *